INVENTOR.
Joe A. Easton
BY Wm. T. Wofford
Attorney

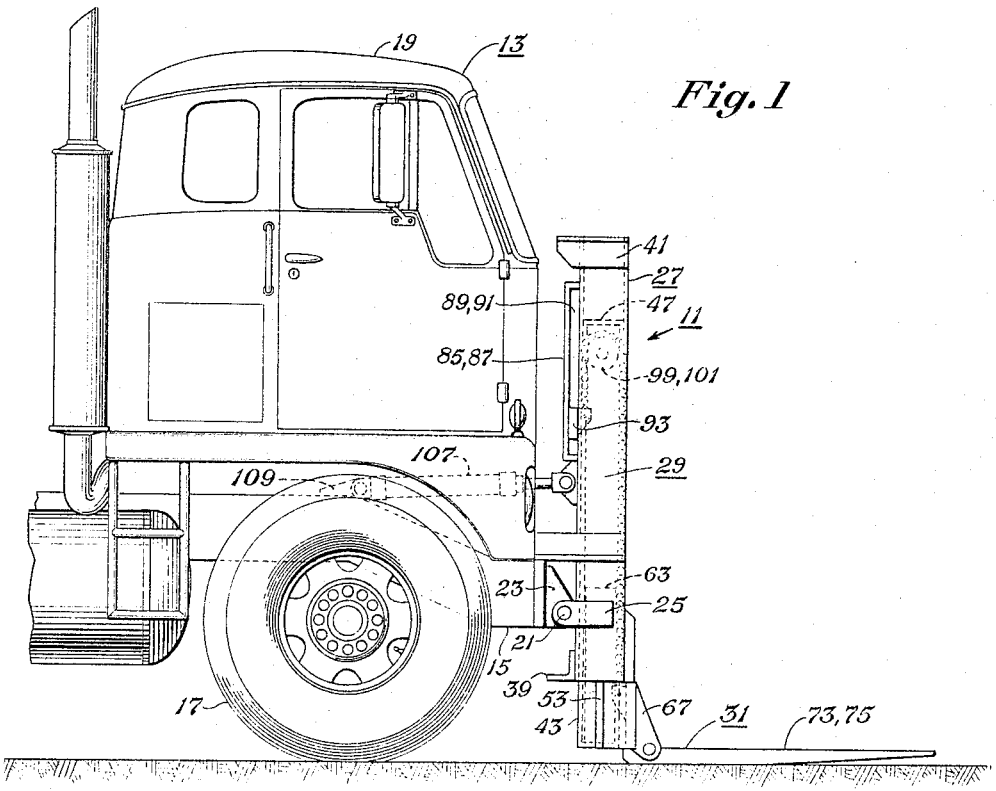
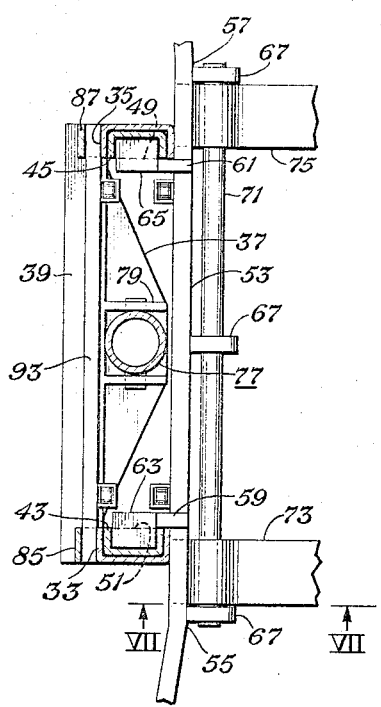
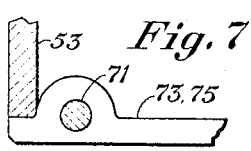
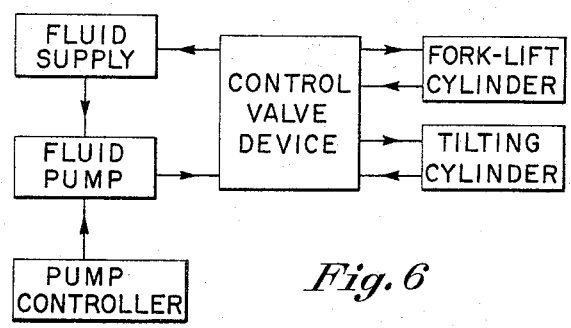
Fig. 1
Fig. 7
Fig. 6
Fig. 5
INVENTOR.
Joe A. Easton
BY Wm. T. Wofford
Attorney Sept. 13, 1966  J. A. EASTON  3,272,287
MATERIALS HANDLING APPARATUS
Filed Aug. 18, 1964  3 Sheets-Sheet 2

Sept. 13, 1966    J. A. EASTON    3,272,287
MATERIALS HANDLING APPARATUS
Filed Aug. 18, 1964    3 Sheets-Sheet 3

INVENTOR.
Joe A. Easton
BY Wm. T. Wofford
Attorney

United States Patent Office 3,272,287
Patented Sept. 13, 1966

3,272,287
MATERIALS HANDLING APPARATUS
Joe A. Easton, Fort Worth, Tex., assignor to Jimmy D. Worthey, James B. Huff, Harry N. Ward, and Harry N. Ward, Jr.
Filed Aug. 18, 1964, Ser. No. 390,357
4 Claims. (Cl. 187—9)

My invention relates to materials handling apparatus and more particularly to an elevator type of materials handling apparatus adaptable for attachment to the front end of trucks and other vehicles. This is a continuation-in-part of my copending application, U.S. Serial No. 306,768, filed September 5, 1963, now abandoned.

Heavy merchandise or goods, which are transported over the highways by trucks and other vehicles, and especially by trailer trucks, are usually loaded onto and unloaded from the vehicles by means of auxiilary materials handling devices such as cranes, hoists, fork-lift trucks, and the like apparatus. The usual highway trailer truck or vehicle is not equipped to load or unload the merchandise or goods that it carries. It is therefore necessary either to load or unload the vehicle by slow, laborious, and expensive manual methods, or auxiliary materials handling apparatus must be provided. Such auxiliary apparatus cannot often be made immediately available at load destinations, and so frequently the vehicle and crew must wait, with resulting economic penalty.

There is a great need for an effective elevator type material handling apparatus that can be readily mounted and carried over the road at the front of a tractor vehicle, so as to be immediately available to load or unload its own trailer upon arriving at each vehicle destination. No such satisfactory apparatus is available in the prior art of which I am aware.

Accordingly it is the general object of the present invention to provide an improved simple and effective elevator-type materials handling apparatus that is readily mountable on the front of a trailer truck tractor or other vehicle but so as to not interfere with the normal over the road travel of the vehicle.

Other objects are effected by my invention as will be apparent from the following description taken in accordance with the accompanying drawings, forming a part of this application, in which:

FIG. 1 is a schematic side elevational view of an elevator type materials handling apparatus constructed in accordance with a preferred embodiment of the present invention and which is mounted on the front end of a trailer truck tractor;

FIG. 5 is a sectional view taken at line V—V of FIG. 2;

FIG. 6 is a diagrammatic arrangement of a fluid control system for the elevator apparatus of FIG. 1;

FIG. 7 is a sectional view taken at line VII—VII of FIG. 5;

Figure 4:
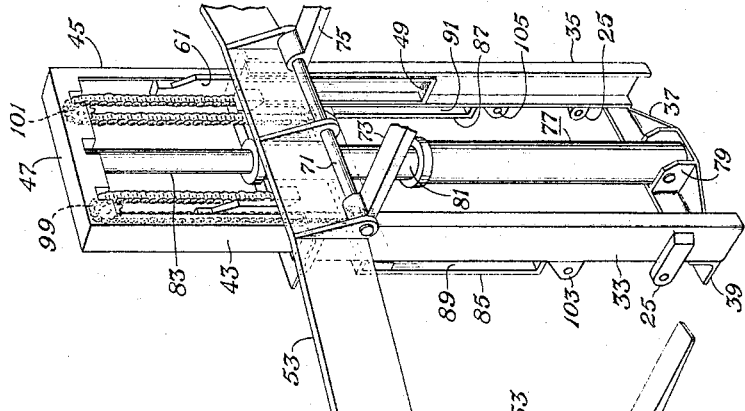
FIGS. 2, 3 and 4 are schematic perspective views showing the elevator apparatus of FIG. 1 in three operative positions.

Referring now to the drawings, a materials handling elevator apparatus 11 which is constructed in accordance with a preferred embodiment of my invention, is shown in FIG. 1 mounted on the front end of a truck tractor 13. The truck tractor 13 may be any one of the conventional types which is readily attachable to and detachable from a load-carrying trailer; a typical type of truck tractor, known as a cab-over engine, being selected for illustration purposes in FIG. 1. The tractor 13 has a main frame or chassis 15 which is supported on a pair of front and rear wheel-axle assemblies 17; the rear wheel-axle assemblies being not shown. A prime mover engine is suitably mounted on the frame 15 and an operator's cab 19 is disposed thereover. It will be observed, by referring to FIG. 1, that the elevator apparatus is conveniently mounted to the chassis 15 by a pivot pins 21 extending through matching holes in a pair of brackets 23 fixed to the frame 15, and another pair of brackets 25 fixed to the elevator apparatus 11.

The elevator apparatus 11 includes a main support frame 27 and a mast structure 29 adapted to telescope in the main support frame structure. This framework provides a guide and apparatus for supporting an elevator structure 31, which elevator structure is adapted to move vertically along the framework and to elevate a load.

Figure 2:
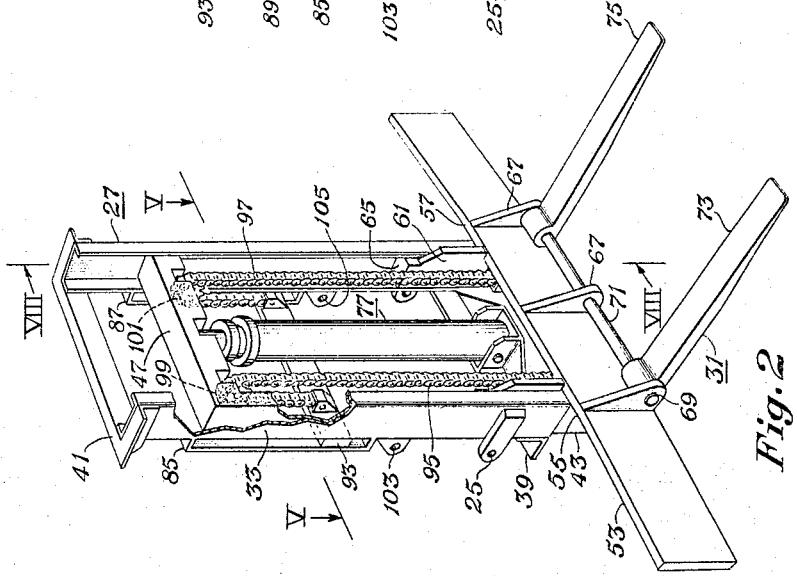
Figure 8:
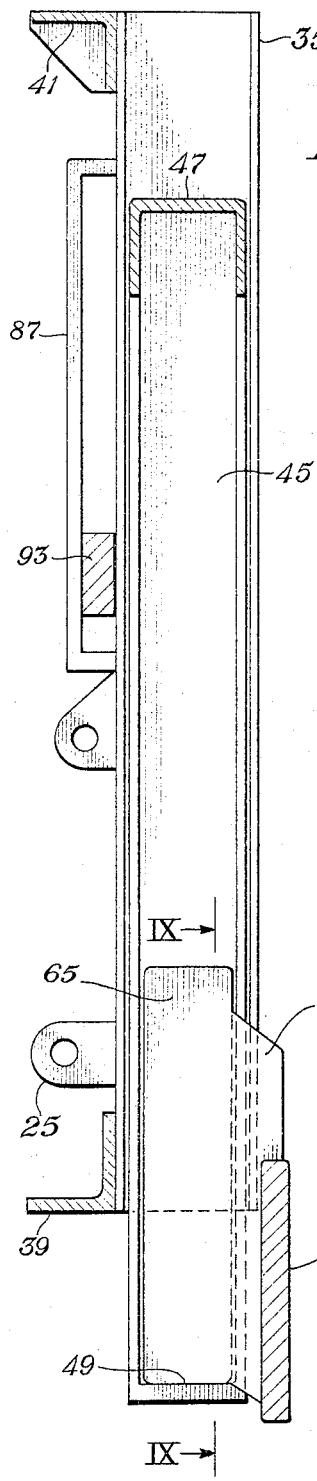
FIG. 8 is a sectional view taken at line VIII—VIII of FIG. 2.
Figure 9:
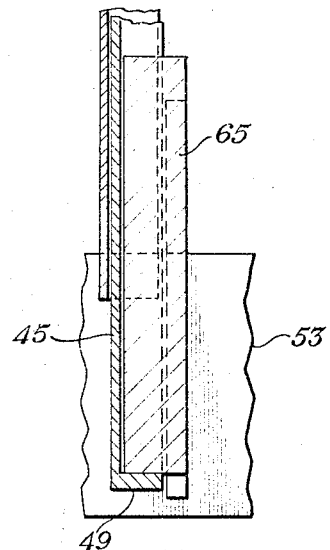
FIG. 9 is a sectional view taken at line IX—IX of FIG. 8.

The main frame structure 27 comprises two vertically extending parallel channel-shaped members 33, 35 which are spaced apart and which are disposed in facing relation, as may be observed by referring to FIGS. 2 and 5. The lower ends of the channel members 33, 35 are held and maintained in such spaced apart relation by an angle-shaped plate member 37 and an angle-shaped member 39 secured together in back-to-back relation and secured to the channel members 33, 35 in any suitable manner. The upper ends of the channels 33, 35 are, likewise, maintained in spaced apart relation by an angle-shaped member 41 secured to the channels 33, 35 in any suitable manner.

The mast structure 29 likewise comprises two vertically extending parallel channel-shaped members 43, 45 which are spaced apart and nested in the channel-shaped members 33, 35. These channel members are disposed also in facing relation. The upper ends of the channel-shaped members 43, 45 are secured to the ends of a cross-head member 47 which maintains the upper ends of the channel-shaped members 43, 45 in spaced apart relation. The lower ends of the channel-shaped members 43, 45 are not connected, but adjacent each end there is provided, on the inside surface of the web portion of each channel member, a stop plate 49, 51 which is for a purpose to be described hereinafter.

The elevator structure 31 comprises a vertical plate member 53 which is bent at two locations 55, 57 so that the end portions of the plate are directed backward toward the wheel-axle assembly 17. On the rearward surface of the vertical plate member 53 there are secured a pair of vertically extending bracket plates 59, 61 to which are secured a pair of vertically extending rectangular shaped columnar members 63, 65. These columnar members, it will be noticed by referring to FIG. 5, and also FIGS. 2 to 4, 8, and 9 are nested in the respective channel members 43, 45 and are adapted to reciprocate therein. On the frontward surface of the vertical plate member 53, there are secured a plurality of spaced-apart triangular-shaped brackets 67. One such bracket is located at or near the mid-length point of the vertical plate member 53, while the others are located at or near the knuckle regions 55, 57. Each such bracket has a hole 69 in the lower portion thereof, and a heavy bar 71, which is preferably cylindrical in shape, is disposed and secured in the holes 69 in any suitable manner. Generally, the bar 71 is disposed substantially perpendicular to the center vertical plane of the tractor 13. A pair of fork-lift tines 73, 75 are loosely fitted on the bar 71, one being on either side of the centrally located bracket 67. The tines are loosely fitted on the bar 71 so that they may be positioned therealong in any desirable location. It will be noticed, also, by referring to FIGS. 1 and 7, that the tines 73, 75 project generally horizontally frontwards from the bar 71 a suitable and convenient distance, and also that they project rearwardly a convenient distance such that they rearward end of the tines are substantially flush with the rear edge of the plate 53. Thus, the tines 73, 75 may freely slide along the bar 71, but they may only pivot upwardly above the bar, because of the coactive engagement of the rearward portion of the tines with the vertical plate member 53.

Referring again to FIG. 2, it will be noticed that a multi-stage hydraulic cylinder and piston assembly 77 is pivotally mounted at its lower end in a U-shaped bracket receptacle 79 which is suitably fixed to the angle-shaped transverse plate member 37. The upper end of the hydraulic cylinder and piston assembly 77 is pivotally connected to the crosshead member 47, at or near the mid-length point thereof. The hydraulic cylinder and piston assembly 77 comprise a conventional type of two-stage unit having a first stage piston 81 and a second stage or inner piston 83; the upper end of the second stage piston 83 being pivotally connected to the crosshead 47, as mentioned previously. A pair of heavy strap members 85, 87 are secured to the rearward flanges of the channel members 33, 35 and are maintained in spaced parallel relation thereto, so as to form vertically extending guide slots 89, 91. Positioned within the guide slots are the end portions of a heavy movable cross-bar member 93 which extends transversely across the main support frame 27, as shown in FIGS. 2 and 5. A pair of lift chains 95, 97 are disposed over a pair of sheaves 99, 101 which are separately journaled in the crosshead 47 and which are rotatable about horizontal axes. One end of each chain is suitably secured to the vertical plate 53 while the other end is suitably secured to the crossbar member 93.

The main support frame 27 is provided also with a pair of brackets 103, 105, fixed to the rearward side thereof. To each such bracket there is pivotally connected one end of a hydraulic tilting ram cylinder and piston assembly 107. The other end of the tilting ram assembly is pivotally connected to a bracket 109 suitably fixed to the main frame 15.

While in a preferred embodiment of my invention there is shown and described an elevator apparatus comprising a pair of fork-lift tines, it will be appreciated by those skilled in the art that the elevator apparatus may also include a plate-type platform which may be pivotally mounted to the bar 71 or other suitable types of load handling structures. Moreover, the mast and main frame structures may include a plurality of telescoping mast structures whereever desired, or if preferred.

Now, to understand the operation of the apparatus reference may be made initially to FIGS. 1 and 2 of the drawings. The tractor 13, it will be assumed, has been detached from its trailer and is ready to pick up and to load goods or merchandise on the trailer. The loading procedure described hereinafter may, of course, be reversed to unload goods from a loaded trailer. The elevator structure 31 is assumed to be resting on the ground surface, the mast structure 29 having telescoped downwardly from the frame 27. In this position, the lower end portions of the columnar members 63, 65 are in contact with and are resting on the stop plates 49, 51 within the channels 43, 45. In this position also, the hydraulic cylinder and piston assembly 77 is almost fully retracted. It should be noted that in the lowermost position of the elevator apparatus, the crossbar member 93 is at the bottom of the guide slots 89, 91 and the lift chains are without slack. To actuate the cylinder and piston assembly 77, it is first necessary to start the truck tractor engine or, in some other manner, to actuate a hydraulic fluid pump indicated in FIG. 6, which is connected to a fluid supply reservoir. It is convenient in most cases to provide a pump controller which may be connected to the pump for the purpose of controlling the fluid output of the pump. As indicated in FIG. 6 also, fluid moves from the pump via suitable conduit means through a control valve device and thence to either the fork-lift cylinder, or the tilting cylinder, or both. Thereafter, the hydraulic fluid may flow as indicated, from the respective cylinders through the control valve device back to the fluid supply reservoir.

Figure 3:
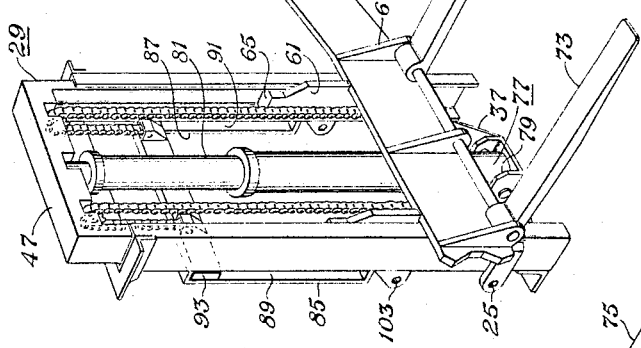

Furthermore, it may be assumed that a load of goods or merchandise is stacked or loaded on the tines and is ready for elevating and loading on an empty trailer (not shown). The control device may be actuated to cause hydraulic fluid to enter the cylinder and piston assembly 77 so that the first and second stage pistons 81, 83 respectively move upward simultaneously. This, it will be understood, causes the mast structure 29 to move upward in the fixed main support frame structure 27. At the same time, the stop plates 49, 51 bearing against the columnar members 63, 65 cause the elevator structure 31 and its load to move upward. It should be noted that the cross-bar member 93 freely moves upward in the guide slots until it reaches the upper limit thereof, and, moreover, it should be observed that the lift chains do not function during this initial or first lift stage procedure. When the cross-bar member 93 reaches the upper end of the guide slots 89, 91, the first stage piston 81 has also simultaneously reached the end of its stroke. This situation is illustrated in FIG. 3. Thereupon, the second stage piston 83 commences to move upwardly, but when it does, the lift chains 95, 97 commence to function, since the ends of the chains are secured to the cross-bar member 93 and it is restrained from moving upward. The other ends of the chains, which are connected to the elevator structure, move the load upward, but at a rate of speed which is twice the speed of the movement of the crosshead 47. In order to effect a suitable smooth rate of elevation, it is desirable to manipulate the pump controller as well as the control valve device to achieve a desirable cross-head speed. During the elevating process just described it may be desirable also to acuate the tilting cylinder and piston assembly 107 so as to tilt the load, in the usual manner, backward toward the cab, in order to stabilize the tractor. After the load has been lifted a sufficient distance, the tractor may be operated and maneuvered as a fork-lift device to place the load of goods and merchandise on the trailer.

Figure 10:
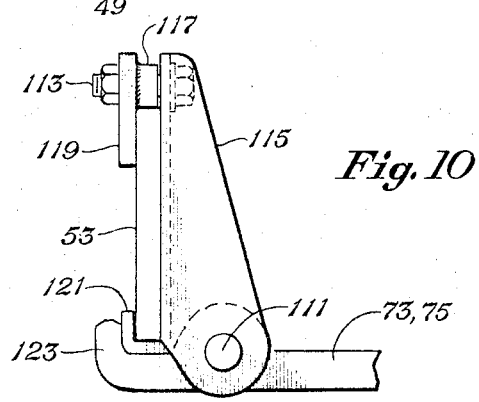
FIG. 10 is a side elevational view, partly in section, showing a tine mounting in accordance with another embodiment of the invention.
Figure 11:
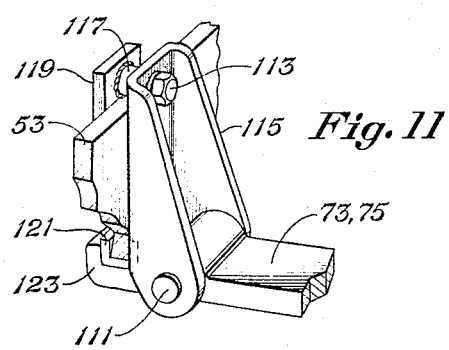
FIG. 11 is a fragmentary schematic perspective view of the tine mounting of FIG. 10.

Another embodiment of the tine mounting is shown by FIGS. 10 and 11. In this embodiment, each tine 73, 75 is pivoted adjacent an end portion at 111 on a channel-shaped support bracket 115. Suitable bolt means 113 extend through the bracket upper end web portion and through a spacer sleeve 117 and a clamp plate 119. The vertical plate member 53 upper portion is disposed between the clamp plate 119 and the rear face of the bracket 115 so as to be clamped thereby. The lower portion of the bracket web has a rearwardly and upwardly extending retainer portion 121 which engages the lower portion of the vertical plate member 53. The tine 73, 75 extends rearwardly beyond is pivot 111 and terminates in an upturned portion 123. This tine rearward portion and upturned portion 123 engages the bracket retainer portion 121. Thus, when the bolt means 113 is tight, the bracket 115 is securely clamped to and retained on the vertical plate 53, and while the tine 73, 75 may tilt upwardly from the horizontal position (so it may be stowed for travel), it will not move downward beyond the horizontal position. The bracket 115 may be moved to any desired position on the vertical plate 53 by merely loosening the bolt means 113 and sliding the bracket.

It is a feature of the present invention that the elevator apparatus may be readily and easily installed on the front of a trailer truck tractor or other suitable vehicle. From the foregoing description it is evident that the apparatus is supported and maintained in position by four pivot pins. Hence, to remove the entire apparatus it is only necessary to remove these four pins and to disconnect the hydraulic fluid conduit (flexible hose) from the cylinder and piston assembly.

Another feature of the present invention is that the total lift distance of the elevator apparatus of the present invention is nearly one and three-quarters times the height of the fixed main frame which is no greater than the distance between the lower edge of the windshield of the cab, and a line that is at the minimum clearance distance above the ground or highway level. It may be helpful to demonstrate this feature by way of an example. The bottom edge of the windshield, of a typical cab-over tractor is approximately eighty-two inches above ground level, and the minimum allowable clearance for equipment above the road is sixteen inches. Therefore, the height of the main support frame is about sixty-six inches. The height of the mast structure may be also about sixty-six inches. A cylinder and piston assembly may be selected wherein the stroke of the pistons is about forty-two inches each. During the first lift stage, that is when the lift chains are not operative, the load is lifted (from at or near ground level) a distance of about forty-two inches, or the stroke distance of the first piston. However, during the second lift stage, when the lift chains are operative, the load is raised twice the distance that the mast structure is raised, which in this instance is about thirty-five inches. That is to say, during the second lift stage the load is raised a distance of about seventy inches. Thus, the load is raised a total of one hundred twelve inches during the two lift stages. It should be noticed that the lower portion of the mast structure 29 can extend downwardly through the bottom end of the main frame structure 27 (see FIGS. 2, 8 and 9) so that the tines 73, 75 can be lowered fully to ground level.

Another feature of the present invention is that the lift chains are operative only during the second or carriage lift stage. Since the height of the fixed frame is determined by the distance between the road clearance level and the level of the lower edge of the windshield, the multiplication of lift distance should occur in a stage or stage subsequent to the initial lift. This is readily accomplished in the present invention described herein by providing the cross-bar 93 and the guide slots 89, 91 within which it operates. Such an arrangement permits the carriage and load to elevate at a one to one ratio during the first stage. But as soon as the cross-bar 93 engages the top of the straps 85, 87 forming the guide slots, the rate of movement of the lift, relative to the piston movement is multiplied in the ratio of two to one.

Another feature of the present invention is that the vertical plate member 53, which has rearwardly sloping end portions, serves as the bumper for the truck tractor. It is evident, from FIGS. 2 through 4, that the bumper moves with the elevator structure. However, when the truck tractor is moving over the highway and when the elevator apparatus is at proper road clearance level, the vertical plate or bumper 53 will be at a proper height above the highway.

Another feature of the present invention is that the respective fork-lift tines are slidable along the bar 71. Thus, they are adjustable to accommodate loads of varying width. Of course, when the tractor is traveling over the highway, the tines may be pivoted upward and suitably secured to the main frame channel members 33, 35 and the mast may also be suitably locked to the fixed frame structure.

While I have shown my invention in only one form, it will be obvious to those skilled in the art that it is not so limited, but is susceptible of various changes and modifications without departing from the spirit thereof.

I claim:

1. In combination with a highway travel type vehicle, a materials handling elevator apparatus comprising:
    (a) a frame structure including spaced apart parallel upright members coupled to the front end of said vehicle, said upright members being disposed with their upper extremities below the lower edge of the frontward field of vision of the truck operator and with their lower extremities having at least road travel clearance above the ground supporting said vehicle;
    (b) a mast structure of length not exceeding that of said frame structure and telescoping said frame structure and movable longitudinally thereof, said mast structure including spaced apart parallel rails disposed adjacent the respective upright members of said frame structure and a cross-head member connecting the upper ends of said rails;
    (c) a hydraulic lift device including a plurality of relatively extensible and retractile elements;
    (d) means mounting the lowermost said element adjacent and fixed relative to said frame structure;
    (e) means fixing the uppermost one of said elements to said crosshead member;
    (f) a load receiving structure coupled to said mast structure and movable longitudinally thereof;
    (g) an elongate bar member disposed adjacent said frame structure and movable from a first position to a second position;
    (h) flexible linkage means anchored to said load receiving structure and to said elongate bar member;
    (i) rotatable sheave means carried by said crosshead over which sheave means said flexible linkage means extends;
    (j) means extending a first element of said lift device and extending simultaneously said mast structure and said load receiving structure equally a first predetermined distance along said frame structure while said elongate bar members moves from said first to said second position;
    (k) means engaging said elongate bar and maintaining the same at said second position; and
    (l) means extending at least one other element of said lift device and extending further said mast structure a second predetermined distance along said frame structure while said sheave means urges said flexible linkage means to move said load receiving structure relative to said mast structure.

2. In combination with a highway travel type vehicle, a materials handling elevator apparatus comprising:
    (a) a frame structure mounted on the front end of said vehicle, said frame being disposed with its upper extremity below the lower edge of the frontward field of vision of the operator and with its lower extremity having at least road travel clearance above the ground supporting said vehicle;
    (b) a mast structure of length not exceeding that of said frame structure and coupled to said frame structure and extensible relative thereto;
    (c) a load receiving structure coupled to said mast structure and movable longitudinally thereof;
    (d) a bar disposed adjacent said frame and movable longitudinally thereof from a first position to a second position;
    (e) flexible linkage means anchored to said bar and to said load receiving structure;
    (f) rotatable means carried by said mast structure over which means said flexible linkage means extends;
    (g) means for simultaneously extending said mast structure and said load receiving structure equally a first predetermined distance along said mast structure while said bar moves simultaneously from said first position to said second position;
    (h) means engaging said bar and maintaining the same at said second position; and
    (i) means for further extending said mast structure a second predetermined distance along said frame while said rotatable means urges said flexible linkage means to effect movement of said load receiving structure relative to said mast structure.

3. In combination with a highway travel type vehicle, a materials handling elevator apparatus comprising:
   (a) a frame structure mounted on the front end of said vehicle, said frame being disposed with its upper extremity below the lower edge of the frontward field of vision of the vehicle operator and with its lower extremity having at least road travel clearance above the ground supporting said vehicle;
   (b) a mast structure of length not exceeding that of said frame structure and coupled to said frame structure and extensible relative thereto;
   (c) a load receiving structure coupled to said mast structure and movable longitudinally thereof;
   (d) flexible linkage means anchored to said load receiving structure and to said frame structure;
   (e) rotatable means carried by said mast structure over which means said flexible linkage means extends;
   (f) means for simultaneously extending said mast structure and said load receiving structure equally a first predetermined distance along said frame structure; and
   (g) means for further extending said mast structure a second predetermined distance along said frame structure while said rotatable means effects movement of said load receiving means relative to said mast structure.

4. In combination with a highway travel type vehicle, a materials handling elevator apparatus comprising:
   (a) a frame structure mounted on the front end of said vehicle, said frame being disposed with its upper extremity below the lower edge of the frontward field of vision of the vehicle operator and with its lower extremity having at least road travel clearance above the ground supporting said vehicle;
   (b) a mast structure of length not exceeding that of said frame structure and coupled to said frame structure and extensible relative thereto;
   (c) a load receiving structure coupled to said mast structure and movable longitudinally thereof;
   (d) flexible linkage means mounted at one end for limited movement relative to said frame structure and fixed at the other end to said load receiving structure;
   (e) rotatable means carried by said mast structure over which means said flexible linkage means extends;
   (f) means for simultaneously extending said mast structure and said load receiving structure equally a first predetermined distance along said frame structure; and
   (g) means for further extending said mast structure a second predetermined distance along said frame structure while said rotatable means effects movement of said load receiving means relative to said mast structure.

References Cited by the Examiner

UNITED STATES PATENTS

| 2,399,632 | 5/1946 | Guerin | 187—9 |
| 2,505,009 | 4/1950 | Schroeder | 187—9 |
| 2,653,678 | 9/1953 | Lehrman | 187—9 |
| 2,980,269 | 4/1961 | Zimmerman | 214—730 |
| 3,045,853 | 7/1962 | Card | 214—672 |
| 3,127,956 | 4/1964 | Hosbein | 187—9 |

FOREIGN PATENTS

| 819,068 | 10/1951 | Germany. |
| 940,844 | 11/1963 | Great Britain. |

EVON C. BLUNK, *Primary Examiner.*

ANDRES H. NIELSEN, SAMUEL F. COLMAN,
*Examiners.*